April 21, 1959  J. A. McNALLY  2,883,131
PNEUMATIC MOUNTING SYSTEM
Filed Dec. 22, 1955  2 Sheets-Sheet 1
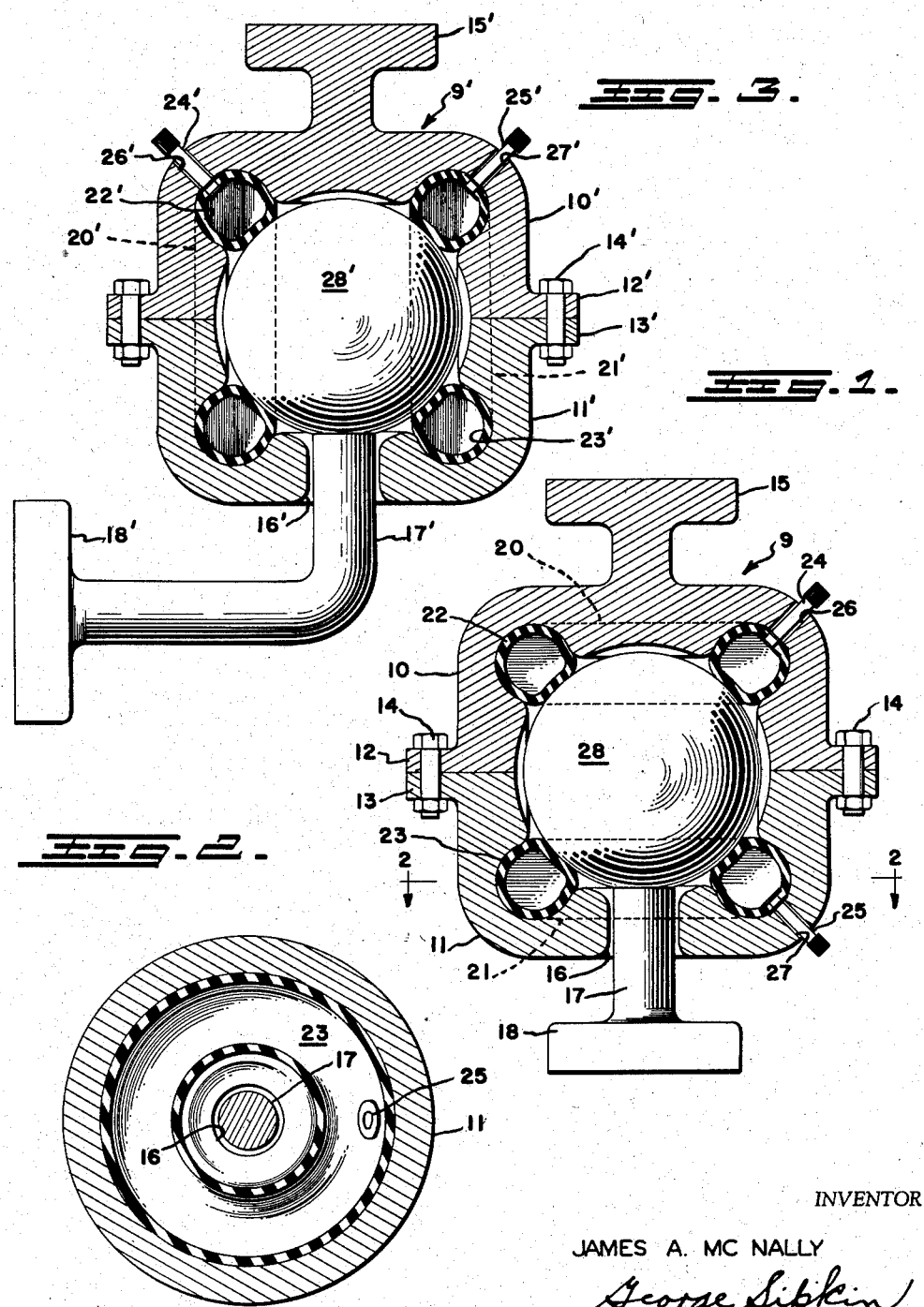
INVENTOR
JAMES A. MC NALLY
BY George Sipkin
B. L. Zanguill
ATTORNEYS

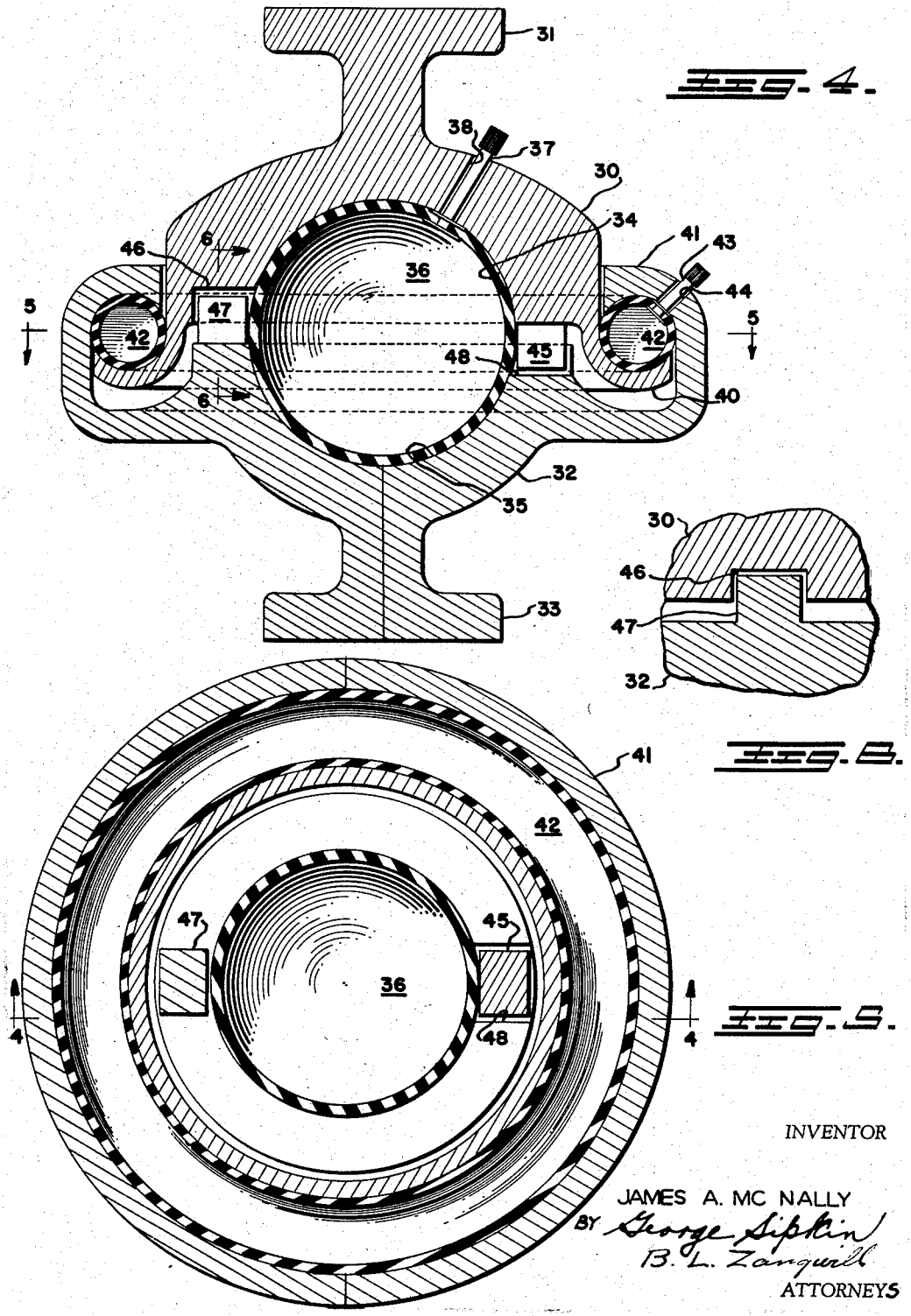
April 21, 1959     J. A. McNALLY     2,883,131
PNEUMATIC MOUNTING SYSTEM
Filed Dec. 22, 1955     2 Sheets-Sheet 2
INVENTOR
JAMES A. MC NALLY
ATTORNEYS 2,883,131
Patented Apr. 21, 1959

2,883,131

PNEUMATIC MOUNTING SYSTEM

James A. McNally, Upper Montclair, N.J.

Application December 22, 1955, Serial No. 554,904

13 Claims. (Cl. 248—22)

(Granted under Title 35, U.S. Code (1952), sec. 266)

The invention described herein may be manufactured and used by or for the Government of the United States of America for governmental purposes without payment of any royalties thereon or therefor.

The present invention relates to machine mounting systems and particularly to pneumatic mounting systems that are subject to severe shock loading.

More particularly, this invention relates to pneumatic mounting systems of the type disclosed in my United States Patents Numbers 2,636,790 and 2,664,257, granted April 28, 1953, and December 29, 1953, respectively.

It is an object of this invention to provide pneumatic mounting to be used between two mechanical masses as an insulation against shock and vibration.

It is further object of this invention to provide a mounting between two masses wherein the stiffness of such mounting may be varied to adjust for mechanical constants in the particular system.

It is a still further object of this invention to provide a mounting between two mechanical masses that are at some angle other than 180° and are not in line.

A still further object of this invention is to provide a mounting between two mechanical masses which in addition to incorporating the properties of insulation from shock and vibration and adjustability for stiffness, also provides for the transmission of torque between the masses.

Other objects and advantages of the invention will be made more apparent by reference to the following detail description and accompanying drawings, in which:

Fig. 1 is a side view partly in vertical section of a machine mounting in accordance with this invention.

Fig. 2 is a transverse section taken on line 2—2 of Fig. 1;

Fig. 3 is a view similar to Fig. 1 and showing a modified mounting in accordance with the present invention;

Fig. 4 is a longitudinal section, taken on line 4—4 of Fig. 5, of a second modified mounting in accordance with this invention;

Fig. 5 is a transverse section taken on line 5—5 of Fig. 4; and

Fig. 6 is a detail section taken on line 6—6 of Fig. 4.

Referring now to Figs. 1 and 2 of the drawings, a pneumatic mounting 9, shown here, comprises a pair of cup-shaped receptacles 10 and 11 formed with circumferential flanges 12 and 13, respectively. The flanges are drilled to provide openings for the reception of a plurality of bolts 14 for securing the receptacles 10 and 11 into unit, only two of which bolts are shown in Fig. 1. The receptacle 10 is formed with an axial flange, or the like, 15 for attachment to a machine to be supported, and the receptacle 11 is formed with an axial opening 16 for the reception of the shank 17 of a pedestal 18, which pedestal may be attached to a foundation for the machine to be supported. So as to allow for movement, as described hereinafter, between the shank 17 and the cup-shaped receptacle 11, the opening 16 is somewhat larger in diameter than is the shank 17.

The cup-shaped receptacle 10 is formed with an annular recess 20 for the reception of an annular, pneumatic tube 22, and the cup-shaped receptacle 11 is formed with a like annular recess 21 for the reception of a like annular, pneumatic tube 23. As shown in Fig. 1, the pneumatic tubes 22 and 23, which resemble inner tubes of a pneumatic tire, are provided with valve stems 24 and 25, which stems pass through openings 26 and 27, respectively, in the receptacles 10 and 11. The valve stems 24 and 25 are equipped with conventional check valves, not shown.

With the cup-shaped receptacles 10 and 11 assembled open side to open side in the manner shown in Fig. 1, a spherical cavity is formed between the two. A spherical element 28 constructed of solid metal, hollow metal or as an inflatable ball, depending upon load conditions to be encountered, is located within the spherical cavity. As viewed in Fig. 1, the upper segment of sphere 28 bears against the pneumatic tube 22, while the lower segment bears against the tube 23. At the bottom, the sphere 28 is supported by the shank 17, and for this purpose, the top of the shank is hollowed slightly to precisely fit the contour of the sphere. If desired, depending upon load conditions, metal filler rings or sockets, not shown, may be placed between the sphere 28 and the tubes 22 and 23, thus preventing wear on such tubes, due to relative movement between the sphere and the tubes. If desired the spherical element 28 may be formed integral with the shank 17 of pedestal 18. In which case, to facilitate assembly, either the shank 17 and pedestal 18 may be formed as separate elements or the bottom receptacle 11 may be formed of two parts clamped together by any suitable means. As shown in Fig. 1, the tubes 22 and 23 are each placed at right angles to the direction of forces passing through the pneumatic mounting.

In practice, the pneumatic mounting illustrated in Fig. 1 may be used as a single supporting means between two mechanical masses or a plurality of such pneumatic units may be used to spread the load between such masses. In any event, the stiffness of the mounting, or mountings, may be varied to best adjust for the mechanical constants in the particular system where employed by varying the pressure in the inflatable tubes 22 and 23. Furthermore, in addition to the properties of insulation for shock and vibration, the pneumatic mounting in accordance with this invention permits of limited freedom of movement between the mechanical masses in substantially all planes.

Referring now to Fig. 3, wherein there is shown a pneumatic mounting system designed primarily for use between two mechanical masses that are connected at some angle other than 180°; that is, two masses that are not in line. The separate elements of the system illustrated in Fig. 3 are similar to those illustrated in Figs. 1 and 2 and are given like reference numerals, except in Fig. 3 for purposes of distinction, the numerals are primed. As will be seen, the elements of Fig. 3 are arranged in the same manner and perform the same functions as those of Fig. 1, except in Fig. 3 the annular recesses 20' and 21' and the annular inflatable tubes 22' and 23' are arranged at an angle of 90° to those of Fig. 1. This angle will be varied, depending upon the angle of transmission of forces between the mechanical masses with which the mounting is used. An angle bracket 18' having a shank 17', transmits the forces from the spherical element 28' to the structure, not shown, to which the bracket is attached.

In practice and in operation, the pneumatic mounting, illustrated in Fig. 3, is used in the same manner and it performs the same functions as that pointed out above in connection with the mounting illustrated in Fig. 1, with the exception that the Fig. 3 mounting is designed primarily for transmitting forces in other than a straight line.

Referring now to Figs. 4, 5 and 6, wherein there is shown an embodiment of my invention incorporating all of the properties of the embodiments shown in Figs. 1 and 3 in regards insulation from shock and vibration, adjustability for stiffness as required by the mechanical constants of the system, and flexibility between connections, and in addition this embodiment incorporates means permitting torque to be transmitted between the connections of the system.

The system shown in Fig. 4 includes an upper cup-shaped receptacle 30 having an axial connecting flange, or the like, 31 formed integral therewith, for connection to a machine mass or a driving element and a lower cup-shaped receptacle 32 having an axial connecting flange, or the like, 33 formed integral therewith to be connected to a second machine mass or a driven element. As shown in Fig. 4, the cup-shaped receptacles 30 and 32 are formed with hemispherical cavities 34 and 35, respectively, which when united in the manner shown form a spherical cavity for the reception of a spherical element 36. The spherical member shown is in the form of an inflatable rubber ball having a valve stem 37 projecting through an opening 38 in the receptacle 30.

Referring still to Fig. 4, the upper receptacle 30 is formed with a peripheral flange 40, shaped to form a semi-annular cavity and the lower receptacle 32 is formed with an inwardly projecting flange 41 that overlies the flange 40 and is shaped to form a second semi-annular cavity, which two cavities unite to form an annular cavity for the reception of an annular inflatable tube 42. The tube 42 is provided with a valve stem 43 that projects through an opening 44 in the flanged portion 41 of the upper receptacle 30.

So as to transmit torque between the upper and lower receptacles, 30 and 32, the upper receptacle is provided with a tooth or projection 45 projecting in an axial direction and with a diametrically opposite recess 46 which loosely mesh, respectively, with a similar recess 48 and projection 47 formed on the lower receptacle 32. So as to facilitate assembly of the pneumatic mounting, the lower receptacle 32 is formed of two parts rigidly clamped together by peripheral flanges and bolts, not shown, but which may be similar, for example, to the flanges 12 and 13 and the bolts 14 of Fig. 1. As shown in Fig. 4, a horizontal plane through the center of the sphere 36 coincides with the medial plane of the tube 42.

In operation of the embodiment of the invention illustrated Fig. 4, the pneumatic ball 36 is inflated to the desired pressure to suit the conditions encountered. The pneumatic tube 42, which acts as a buffer and provides for limited movement between the mounting elements, is also inflated to the desired pressure. As described above, the projection or tooth 45 fits somewhat loosely within the recess 48 and the tooth 47 likewise fits loosely within the recess 46. With this arrangement and because of the inherent yielding of the inflated ball 36 and tube 42, there is provided a machine mount that permits of limited relative movement between the elements in all planes, whether the mount be used as a support, a torque transmission or as a combination of support and torque transmission. As with the pneumatic mounts illustrated in Figs. 1 and 3, the stiffness of the mount illustrated in Fig. 4 may be adjusted at will and without disturbing any of the machine elements by merely varying the air pressure in the ball 36 and/or tube 42.

While only three specific embodiments of the present invention have been illustrated and described, the invention obviously may take other forms and be variously applied. It is therefore to be understood that within the scope of the appended claims the invention may be practiced otherwise than as specifically described.

What is claimed is:

1. A resilient mounting comprising a first receptacle having a hemispherical cavity formed therein, a second receptacle having a hemispherical cavity formed therein, said first and second receptacles being positioned in open-ended juxtaposition with the hemispherical cavities forming a substantially spherical cavity, a spherical member within said spherical cavity, each of said receptacles having an additional annular cavity opening into said spherical cavity, and yieldable inflatable pneumatic means within each of said annular cavities cooperating and in supporting contact with said spherical member for yieldably transmitting forces through said mounting.

2. A resilient mounting as set forth in claim 1 wherein said yieldable means includes a pneumatic tube and a check valve through which said tube may be inflated, said tube cooperating with said spherical member for yieldably transmitting forces through said mounting.

3. A resilient mounting as set forth in claim 1 wherein said first and second receptacles each have mounting means, at least one of said mounting means providing limited movement of said mounting means in a plurality of directions relative to each other.

4. A resilient mounting as set forth in claim 1 wherein said first receptacle includes means for receiving external forces for transmission to said second receptacle, wherein said second receptacle includes means for transmitting forces therefrom in substantially a straight line.

5. A resilient mounting of a type described comprising a pair of relatively movable members, a first of said members comprising a first receptacle having a central hemispherical cavity and an annular outer outwardly-directed semi-circular cavity, a second of said members comprising a second receptacle having a central hemispherical cavity and an annular outer inwardly-directed semi-circular cavity, said first and second receptacles being positioned in open-ended juxtaposition with the hemispherical cavities forming a substantially spherical cavity and said semi-circular cavities forming an annular circular cavity about and spaced from said spherical cavity, a resilient spherical member in said spherical cavity, and an annular resilient member in said annular cavity.

6. A resilient mounting as defined in claim 5 but further characterized by said receptacles having circularly-arranged circumferentially-spaced intermeshed teeth between said spherical member and said annular member.

7. A resilient mounting as defined in claim 5 but further characterized by said spherical member and said annular member being inflatable pneumatic members with check valves for inflation.

8. A resilient mounting as defined in claim 7 but further characterized by said receptacles having circularly-arranged circumferentially-spaced intermeshed teeth between said spherical member and annular member.

9. A resilient mounting as defined in claim 8 but further characterized by said second receptacle being in two parts.

10. A resilient mounting of a type described comprising a pair of relatively movable members, a first of said members comprising a first receptacle having a central hemispherical cavity, a second of said members comprising a second receptacle having a central hemispherical cavity, said first and second receptacles being positioned in open-ended juxtaposition with the hemispherical cavities forming a substantially spherical cavity, a spherical member within said spherical cavity, said spherical member and one of said relatively movable members having cooperating means for carrying said spherical member on the last said relatively movable member, said receptacles having a pair of parallel annular cavities opening into said spherical cavity, and resilient inflatable pneumatic means in each of said annular cavities projecting therefrom and in supporting contact with said spherical member for transmitting forces through said mounting, said pneumatic means being on opposite sides of said spherical member.

11. A resilient mounting as defined in claim 10 but further characterized by each of said pneumatic means including means comprising a check valve through which the pneumatic means is inflatable.

12. A resilient mounting as defined in claim 11 but further characterized by said spherical member comprising a resilient inflatable pneumatic member, and means comprising a check valve through which the last said member is inflatable.

13. A resilient mounting as defined in claim 11 but further characterized by said cooperating means being a loose connection whereby forces are transmitted in any direction.

References Cited in the file of this patent

UNITED STATES PATENTS

| | | |
|---|---|---|
| 1,003,579 | Bancroft | Sept. 19, 1911 |
| 1,063,286 | Richmond | June 3, 1913 |
| 1,163,425 | Lindstrom | Dec. 7, 1915 |
| 2,267,874 | Renaux | Dec. 30, 1941 |
| 2,491,229 | Taylor | Dec. 31, 1949 |

FOREIGN PATENTS

| | | |
|---|---|---|
| 605,864 | France | Feb. 26, 1926 |
| 137,831 | Austria | June 11, 1934 |